No. 798,900. PATENTED SEPT. 5, 1905.
E. H. HARRY & I. L. SHAW.
CEMENT BLOCK PRESS.
APPLICATION FILED MAR. 23, 1904.
3 SHEETS—SHEET 1.
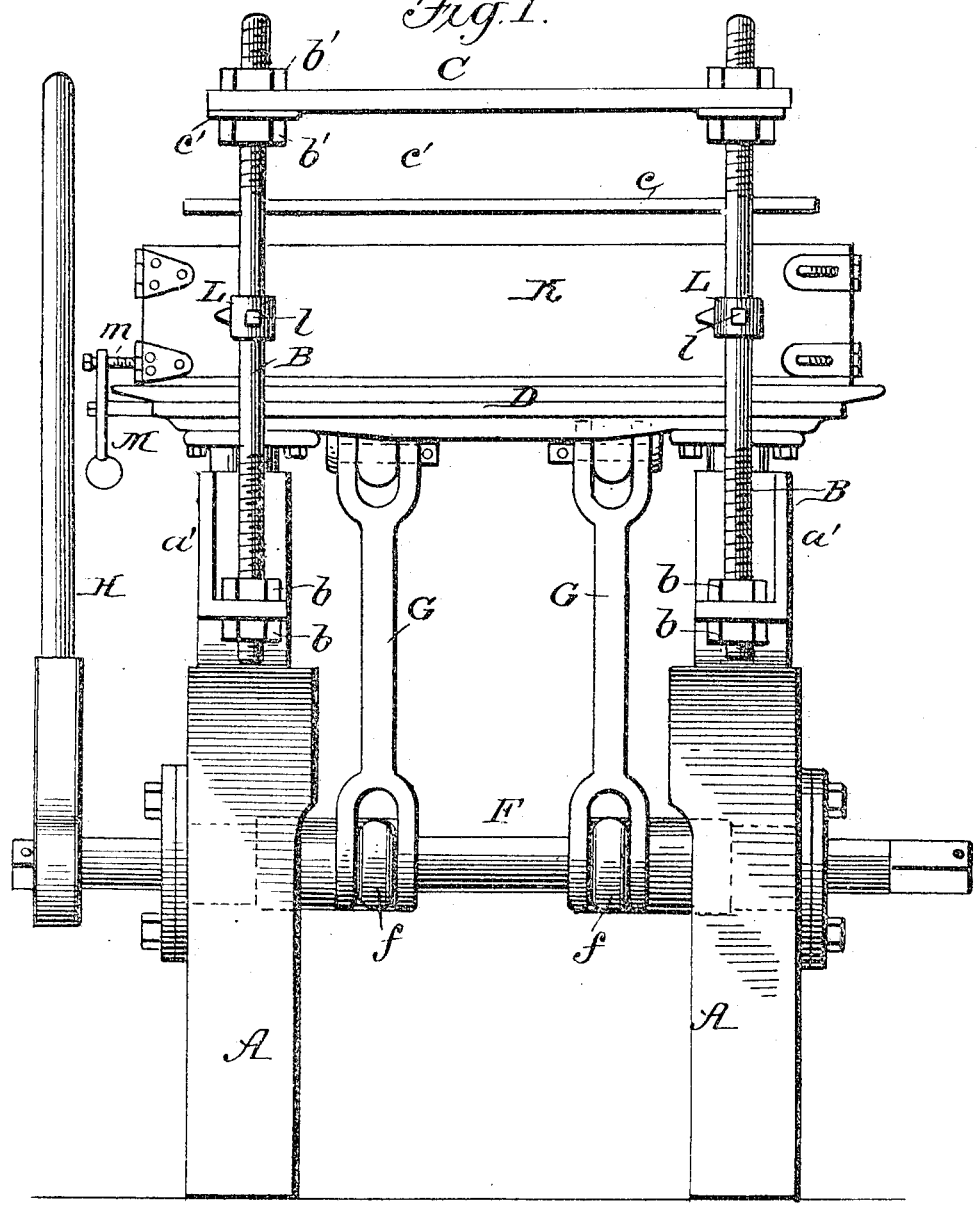

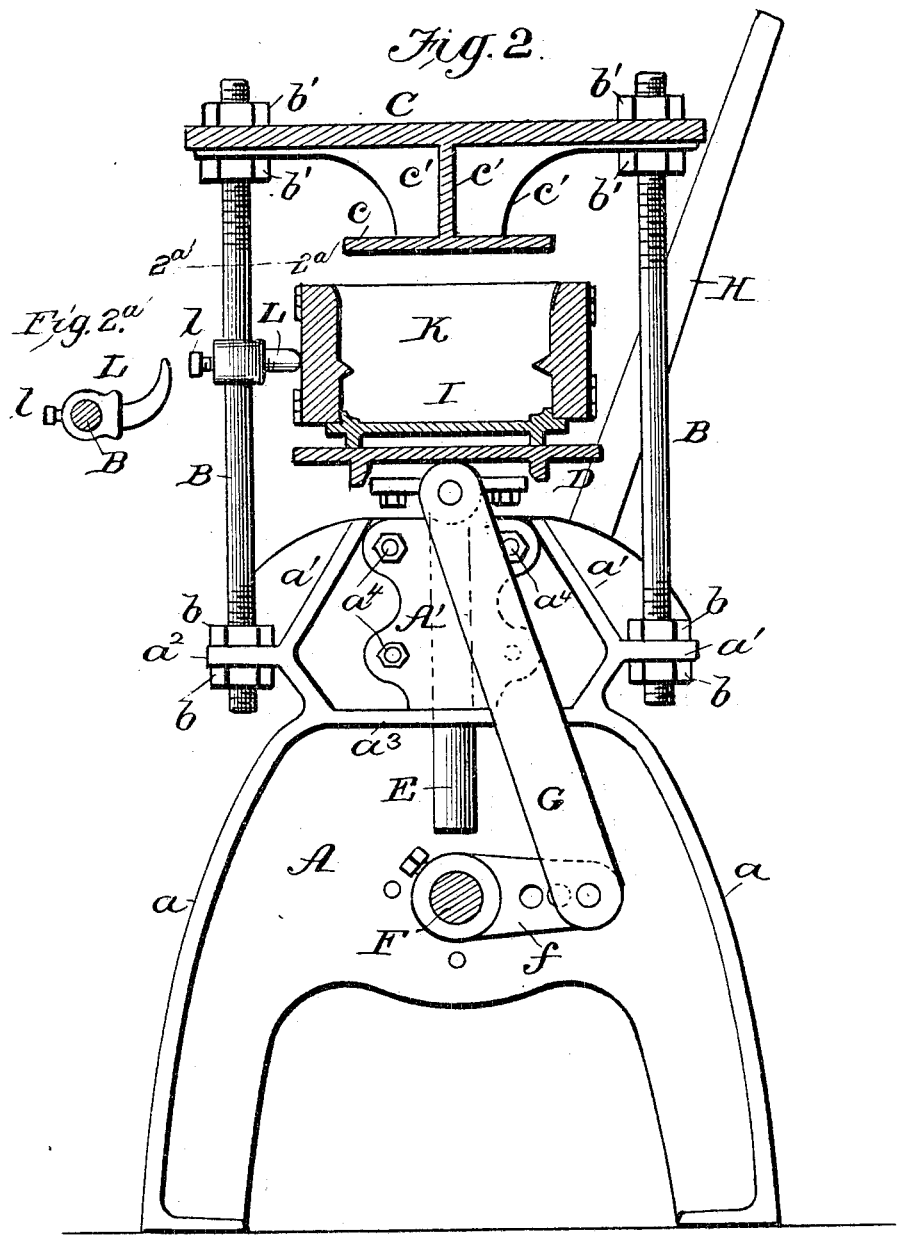

No. 798,900. PATENTED SEPT. 5, 1905.
E. H. HARRY & I. L. SHAW.
CEMENT BLOCK PRESS.
APPLICATION FILED MAR. 23, 1904.
3 SHEETS—SHEET 3.
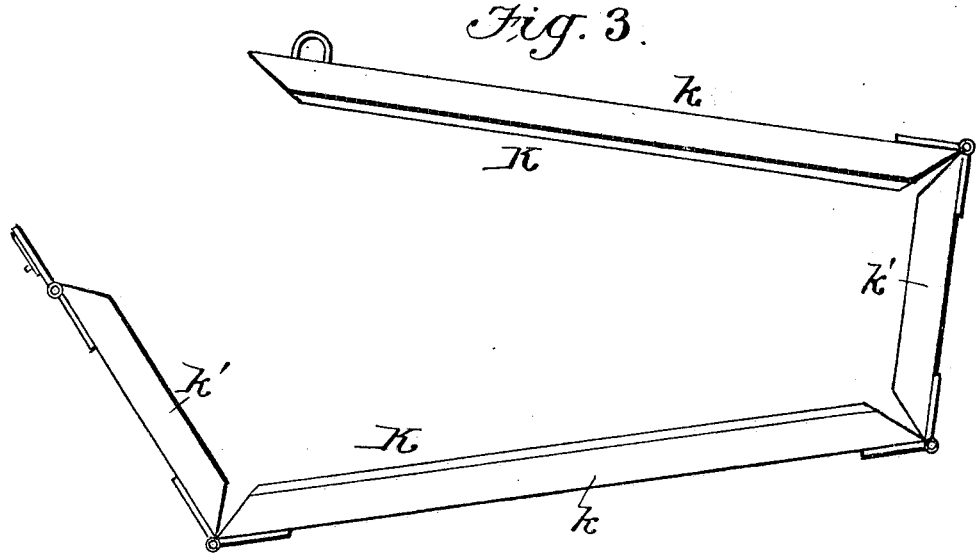
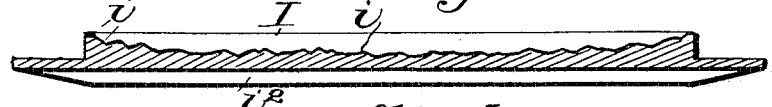
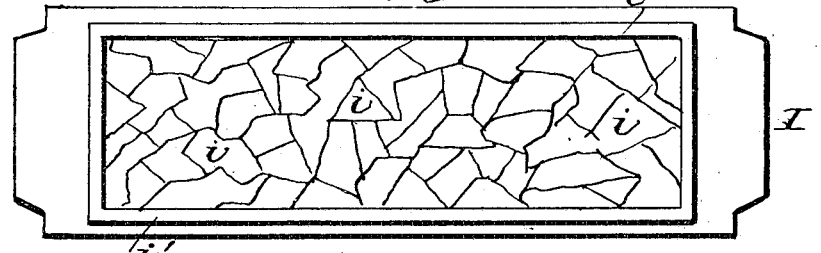
 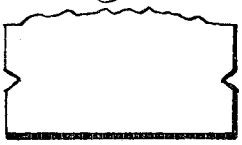 
WITNESSES:
Jos. A. Ryan
Amos W. Hart
INVENTORS
Erastus H. Harry.
Isaac L. Shaw.
BY Munn & Co.
ATTORNEYS

UNITED STATES PATENT OFFICE.

ERASTUS H. HARRY AND ISAAC L. SHAW, OF GIBSON CITY, ILLINOIS.

CEMENT-BLOCK PRESS.

No. 798,900.   Specification of Letters Patent.   Patented Sept. 5, 1905.

Application filed March 23, 1904. Serial No. 199,629.

*To all whom it may concern:*

Be it known we, ERASTUS H. HARRY and ISAAC L. SHAW, citizens of the United States, residing at Gibson City, in the county of Ford and State of Illinois, have made certain new and useful Improvements in Cement-Block Presses, of which the following is a specification.

The employment of cement blocks as a foundation material for construction of foundations and walls of buildings has greatly increased of late and their superiority for this purpose has led to many inventions in means for producing them.

My present invention has for its object to provide an improved press which shall be distinguished by lightness, strength, rigidity, ease of operation, and economy of construction.

The features of construction, arrangement, and combination of parts are as hereinafter described, and illustrated in the accompanying drawings, in which—

Figure 1 is a side elevation of our improved press. Fig. 2 is a central vertical transverse section of the same. Fig. $2^a$ is a cross-section on line $2^a$ $2^a$ of Fig. 2. Fig. 3 is a plan view of a mold-box or block-former forming a part of the press. Fig. 4 is a longitudinal section of a bottom plate employed in connection with the mold-box. Fig. 5 is a plan view of the same. Figs. 6, 7, 8, and 9 are end views of different forms of blocks produced by our improved press.

As shown in Figs. 1 and 2, the frame of our improved press is constructed as follows: A indicates two parallel vertical frames, B four posts connected therewith, and C a fixed or head platen. In order that the frames A may combine maximum lightness, strength, and rigidity, as well as provide bearings for other parts, they are constructed with flanges $a$, $a'$, $a^2$, $a^3$, and $a^4$ on the inner side. The flanges $a$ extend from the feet of the frames to a point where they join the horizontal flange $a^3$ and the angular flanges $a$. The latter have lateral extensions which constitute the flanges $a^2$. These are perforated to receive the posts B, which are constructed in the form of threaded rods, the attachment being effected by means of nuts $b$, whereby convenient attachment and detachment is provided for. The head-platen C spans the space between the tops of the posts B and rigidly connects them. The platen proper, $c$, is formed integrally with vertical ribs or webs $c'$, which connect it with the head-plate C. By the above-described construction the frames A and the head-platen combine lightness and strength in the highest degree. It may be adjusted higher or lower by means of nuts $b'$, applied to the threaded upper ends of the posts B. The movable platen D is provided with two vertical pendent guide-rods E, which work in boxes formed in part by the frames A—that is to say, the upper portions of the frames A are provided with vertical grooves, and cap-plates A' are correspondingly constructed and secured to the plates above the space inclosed by the flanges $a'$ $a^3$ by means of bolts and nuts, as shown in Fig. 2. The guide-rods E are adapted to slide in the boxes thus formed and work through openings provided in the horizontal flanges $a^3$. The latter thus form a part of the box, which is in practice lined with Babbitt metal. Thus the movable platen D is arranged directly above the frames A and is guided vertically and held rigidly horizontal by means of the rods E, as will be readily understood.

The means for reciprocating the platen D are as follows: A horizontal rock-shaft F has its bearings in the lower portions or webs of the frames A and is provided with parallel radial crank-arms $f$, which are connected by rods or pitmen G with the platen D at points directly beneath its middle portion. The shaft F is provided with a lever H, as shown in Fig. 1, whereby it may be rocked for raising and lowering the movable platen D, as will be readily understood. As shown in Fig. 2, the radial crank-arms $f$ are provided with a series of holes, which provides for shifting the points of attachment of the connecting-rods G, as may be required to adapt the platen to make a greater or less traverse.

The means for molding the bottom and sides of a cement block are as follows: In Figs. 4 and 1 we illustrate a bottom plate, commonly called a "drier" I, which will in practice be placed upon the movable platen D, as shown in Figs. 1 and 2. A mold-box or block-former K rests upon the drier I, as shown in said figures. As represented in Fig. 3, this former K is composed of two side pieces $k$ and end pieces $k'$, the same being hinged together at three points or corners and provided at a fourth point or corner with means for locking them rigidly together. It is apparent that when thus locked together the former is rectangular and oblong. The drier I may have a relief or intaglio surface, according to the face which it is desired the cement block shall have. The face is indicated by $i$ in Figs. 4 and 5, and in this instance it is adapted to form a rough-faced block, such as indicated in Fig. 7. The face portion $i$ of the drier I is raised above the surrounding portion, or, in other words, the upper side of the drier I is rabbeted, thus forming a shoulder or flange upon which the mold-box or former K rests, as indicated in Figs. 1 and 2. In other words, when the former K is applied to the drier its inner sides conform to and lie in contact with the raised flange $i'$ of the drier, thus forming the complete mold for receiving the cement required to form a block of any desired pattern.

When the parts are arranged as shown in Figs. 1 and 2 and the mold-box or former has been filled with cement, the lever is operated to rock the shaft F, and thereby force the movable platen D upward, so that the fixed platen C enters the former K and presses upon the upper surface of the cementitious material. It will be seen that the arrangement of the arms of the rock-shaft F is such that they form practically a toggle-joint with the bars G, so that the farther the platen D is moved upward the greater the power which may be applied by means of the lever H. Upon relieving pressure upon the lever the platen D descends until its lower portion rests upon the frames A, when the former K may be released and removed from the drier, leaving the cement block standing thereon. It will be noted that since the parts $k$ $k'$, composing the former, are adapted to be opened at the corners the block is not liable to be injured in the removal of the former. Further, the upper inner corners of the former are beveled, as shown in Fig. 2, to allow easy entrance of the head-platen C. The drier I with the block thereon is then slid off and carried away to be set in a suitable place for complete drying of the block. The projecting flange of the drier I, especially the end portions, form, practically, handles by which the drying-block may be raised and conveniently carried. The under side of the drier I is provided with two longitudinal ribs $i^2$, which allow space for the introduction of the fingers of the workmen between the platen D and the drier in the act of removing the latter.

In order to place the former K and drier I on the movable platen to receive the fixed platen $c$, or, in other words, to secure due alinement of these parts, we apply guides L to the vertical posts B on one side of the press. (See Figs. 1 and 2.) These are curved arms having openings that adapt them to be slid down upon the posts B, and they are clamped at the required point by means of screws $l$. The said guides L are curved in the same direction, so that when the former and drier are slid upon the movable platen D they offer no obstruction thereto.

We further provide a stop to arrest the former at the right point. As shown in Fig. 1, this is formed by means of a pivoted swinging arm or bar M, having an adjustable set-screw $m$. The bar M is weighted at one end and pivoted upon an arm extending from one end of the movable platen D. The upper end, which carries the screw $m$, is thus held normally in position to arrest the former K. Thus when the former is moved off at that end of the press, as is done when more than one man is at work at the press, the operator raises the weighted end of the bar M, so as to bring the screw below the drier I, which permits the former to be slid off without contact with the stop. Driers I will be provided with any desired form of faces in relief or intaglio, according to the use to which the block is to be put. Thus Fig. 6 shows a block having a panel face, Fig. 7 a rough face, and Fig. 8 a flat face, while Fig. 9 represents a segmental block having side and end tongues and grooves adapted to form part of a cylindrical drain or sewer.

Having thus described our invention, what we claim as new, and desire to secure by Letters Patent, is—

1. In a press of the character described, the combination of two parallel, vertical, supporting-frames A having lateral flanges $a^2$, vertical posts B supported on said flanges, a head-platen applied to the four posts and connecting the same at the top, and the movable platen having pendent guide-rods E, the aforesaid frames having vertical bearings for said rods, all the aforesaid parts being detachably connected, substantially as described.

2. In a press of the character described, the combination, with the end frames having flanges $a'$ and $a^2$ on their inner faces, caps A' bolted to the said frames in the space between the flanges $a'$ and forming bearings for the guide-rods of the movable platen, vertical posts detachably secured to and supported upon the flanges $a^2$, the head-platen rigidly connecting the upper ends of the posts and the movable platen with its pendent rods connecting the aforesaid frames, substantially as described.

3. In a cement-block press, the combination, with base-frames, a head-platen and posts supporting the latter, of guides for the former, the same being attached to the said posts and projecting inward and curved laterally, and a movable platen for carrying removable block-forming devices, substantially as described.

4. In a cement-block press, the combination, with suitable base-frames, and a movable platen for carrying block-forming devices, of a stop attached to the platen and movable in a vertical plane, substantially as described.

5. In a cement-block press, the combination, with the suitable base-frames, a fixed platen, and means for supporting it, of a movable platen for carrying a block-former, a stop for the latter, which consists of a weighted bar pivoted to the platen and having at its free end a set-screw which is normally held in position for engagement with the former, substantially as described.

ERASTUS H. HARRY.
ISAAC L. SHAW.

Witnesses:
O. W. HOLMES,
W. A. DAVIDSON.